(12) United States Patent
Ohashi

(10) Patent No.: US 8,511,356 B2
(45) Date of Patent: Aug. 20, 2013

(54) PNEUMATIC TIRE WITH TREAD HAVING TRAPEZOIDAL SHAPE OBLONG HOLES IN SIDEWALL OF MAIN GROOVE

(75) Inventor: Toshiyuki Ohashi, Osaka-fu (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 818 days.

(21) Appl. No.: 12/669,577

(22) PCT Filed: Jun. 18, 2008

(86) PCT No.: PCT/JP2008/061094
§ 371 (c)(1),
(2), (4) Date: Jan. 19, 2010

(87) PCT Pub. No.: WO2009/031353
PCT Pub. Date: Mar. 12, 2009

(65) Prior Publication Data
US 2010/0193100 A1 Aug. 5, 2010

(30) Foreign Application Priority Data
Sep. 5, 2007 (JP) ................................. 2007-230087

(51) Int. Cl.
*B60C 11/117* (2006.01)
*B60C 11/12* (2006.01)
*B60C 11/13* (2006.01)

(52) U.S. Cl.
USPC ............. 152/209.17; 152/209.18; 152/DIG. 3

(58) Field of Classification Search
USPC ........................... 152/209.17, 209.18, DIG. 3
See application file for complete search history.

(56) References Cited

U.S. PATENT DOCUMENTS

2005/0000613 A1*  1/2005  Maruoka et al. ........... 152/209.1
2005/0150582 A1*  7/2005  Matsumura .............. 152/209.18

FOREIGN PATENT DOCUMENTS

| JP | 03-157208    |   | 7/1991  |
|----|--------------|---|---------|
| JP | 08-058317 A  | * | 5/1996  |
| JP | 10-315711    |   | 12/1998 |
| JP | 2001-277815  |   | 10/2001 |
| JP | 2006-35968   |   | 2/2006  |
| JP | 2006-69305   |   | 3/2006  |

OTHER PUBLICATIONS

Machine translation for Japan 08-058317 (no date).*

* cited by examiner

*Primary Examiner* — Steven D Maki
(74) *Attorney, Agent, or Firm* — Fish & Richardson P.C.

(57) ABSTRACT

A pneumatic tire with improved steering stability without raising air columnar resonance noise is provided. The pneumatic tire comprises first oblong holes 11 having an opening portion of a trapezoidal shape that is elongated in the depth direction of a main groove 1 and whose depth $D_1$ on the tread surface side is shallower than a depth $D_2$ on the groove bottom side and second oblong holes 12 having an opening portion of a trapezoidal shape that is elongated in the depth direction of the main groove and whose depth $D_4$ on the groove bottom side is shallower than a depth $D_3$ on the tread surface side, wherein number of the first oblong holes 11 is 50 to 100% of the sum of oblong holes 11 and 12, the depths $D_2$ and $D_3$ are at least not less than 0.5 mm and 0.05 to 0.3 times a width W of the main groove 1, the depths $D_1$, $D_4$ are not greater than 0.1 times a depth D of the main groove 1, widths w of the oblong holes 11, 12 are at least not less than 0.5 mm and 0.05 to 0.2 times the width W of the main groove 1, and heights H of the oblong holes 11, 12 in the depth direction of the main groove are 50 to 80% of the depth D of the main groove 1.

2 Claims, 3 Drawing Sheets

PNEUMATIC TIRE WITH TREAD HAVING TRAPEZOIDAL SHAPE OBLONG HOLES IN SIDEWALL OF MAIN GROOVE

TECHNICAL FIELD

The present invention relates to a pneumatic tire with improved steering stability without raising air columnar resonance noise level.

This application claims benefit of priority based on Japanese Patent Application No. 2007-230087 filed on Sep. 5, 2007, the entire same contents of which are incorporated by reference herein.

BACKGROUND ART

In a state where a tire contacts the ground, tubular space is formed by a main groove extending in the tire circumferential direction and a road surface. The rotation of tires lets air compressed in the tubular space to release outside, resulting in generating air columnar resonance noise. Since the air columnar resonance noise is offensive noise whose frequency is around 1 kHz, reduction in air columnar resonance noise has been demanded conventionally. For example, the pneumatic tire disclosed in the patent document 1 has a great number of oblong holes that extend in the depth direction of a main groove formed in a sidewall of the main groove. With the oblong holes, friction resistance against the air flow in the main groove increases and as a result, air columnar resonance noise is reduced.

Patent Document 1: Unexamined Japanese Laid-Open Patent Publication No. 10-315711 (FIG. 1)

DISCLOSURE OF THE INVENTION

Problem to be Solved by the Invention

The pneumatic tire of the patent document 1 has oblong holes extending in the depth direction of a main groove and not opening on a tread surface when it is brand-new, whose opening portions are rectangular and whose depth is constant. Therefore, there has been a risk that when tire wear progresses, the oblong holes open on the tread surface all together and rigidity of blocks or ribs is rapidly decreased, thereby degrading steering stability.

On the other hand, if each volume of the oblong holes is made smaller in order to prevent a rapid decrease in rigidity of the blocks or ribs, which is caused by the progress of tire wear, frictional resistance against the air flow in the main groove is also lowered, resulting in increase in the level of air columnar resonance noise.

The object of the present invention is to provide a pneumatic tire with improved steering stability without raising the level of air columnar resonance noise.

Means for Solving the Problems

The pneumatic tire of the present invention has main grooves extending in the tire circumferential direction formed on a tread, wherein a sidewall of the main groove includes first oblong holes each having an opening portion of a trapezoidal shape which is elongated in the depth direction of the main groove and whose depth D1 on the tread surface side is shallower than a depth D2 on the groove bottom side, and second oblong holes each having an opening portion of a trapezoidal shape which is elongated in the depth direction of the main groove and whose depth D4 on the groove bottom side is shallower than a depth D3 on the tread surface side, number of said first oblong holes is 50 to 100% of the sum of said first and second oblong holes, the depths D2 and D3 are at least not less than 0.5 mm and 0.05 to 0.3 times a width W of said main groove, the depths D1 and D4 are not greater than 0.1 times a depth D of said main groove, widths w of said first and said second oblong holes are at least not less than 0.5 mm and 0.05 to 0.2 times the width W of said main groove, and heights H of said first and said second oblong holes in the depth direction of the main groove are 50 to 80% of the depth D of said main groove.

By forming in the sidewall of the main groove the first and second oblong holes each having an opening portion of a trapezoidal shape which is elongated in the depth direction of the main groove, higher friction resistance against the air flow in the main groove is provided, which results in reducing the air columnar resonance noise.

The sidewall of the main groove includes the first oblong holes each having a shallow tread surface side and the second oblong holes each having a deep tread surface side. Therefore, compared with the conventional tire in which oblong holes having the same cavity volumes as the present invention and a constant depth are arranged, even if tire wear progresses to appearance of the oblong holes on the tread surface, rigidity of blocks and ribs is not rapidly decreased, nor is steering stability degraded. Furthermore, from the viewpoint of achieving uniform rigidity of blocks and ribs, it is preferable that number of the first oblong holes is set at 50 to 100% of the sum of the first and second oblong holes.

Figure 1:
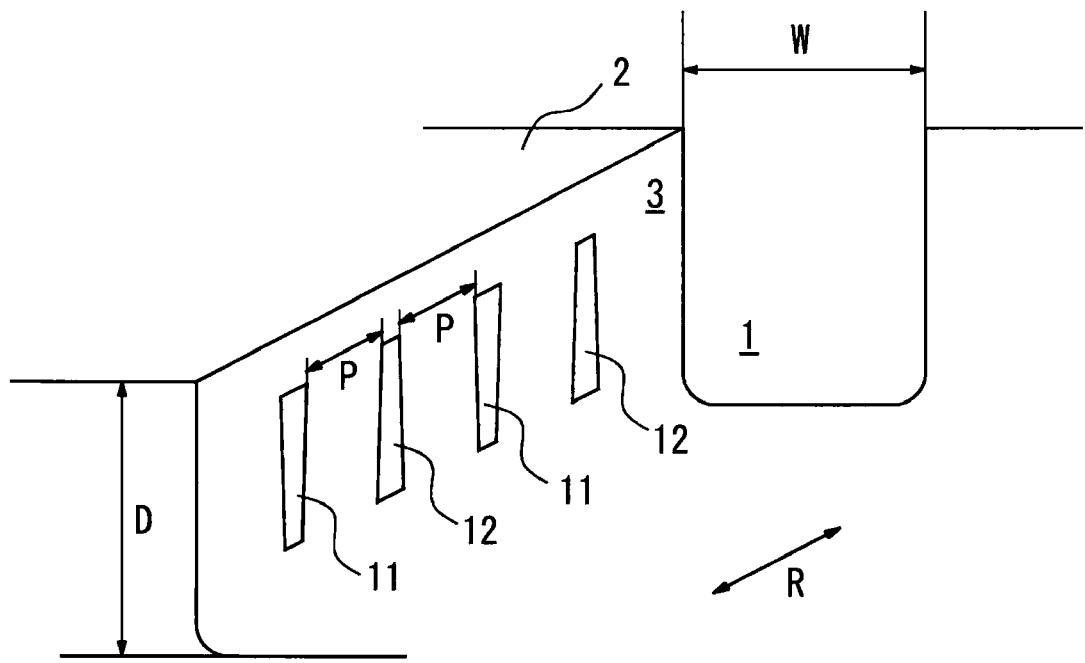
FIG. 1 is a view showing part of the main groove of the pneumatic tire related to the present invention.

| DESCRIPTION OF THE REFERENCE NUMERALS | |
| --- | --- |
| 1 | main groove |
| 2 | block |
| 3 | sidewall of main groove |
| 11 | first oblong hole |
| 12 | second oblong hole |

BEST MODE FOR CARRYING OUT THE INVENTION

Hereinafter, the embodiments for carrying out the pneumatic tire of the present invention are described with referent to drawings. FIG. 1 is a view showing a sidewall of a main groove of the pneumatic tire related to the present invention. A main groove 1 extends in the tire circumferential direction R and forms a block 2 together with a transverse groove (not illustrated). In a sidewall 3 of the main groove 1, first oblong holes 11 and second oblong holes 12 are formed. A sidewall opposed to the main groove 1 (not illustrated) also includes the first oblong holes 11 and the second oblong holes 12 as well. Moreover, this shows an example of the tire with blocks formed on a tread, but the same effect can be obtained even with a tire having the first oblong holes 11 and the second oblong holes 12 formed in the sidewall of the main groove, where ribs are formed.

Figure 2:
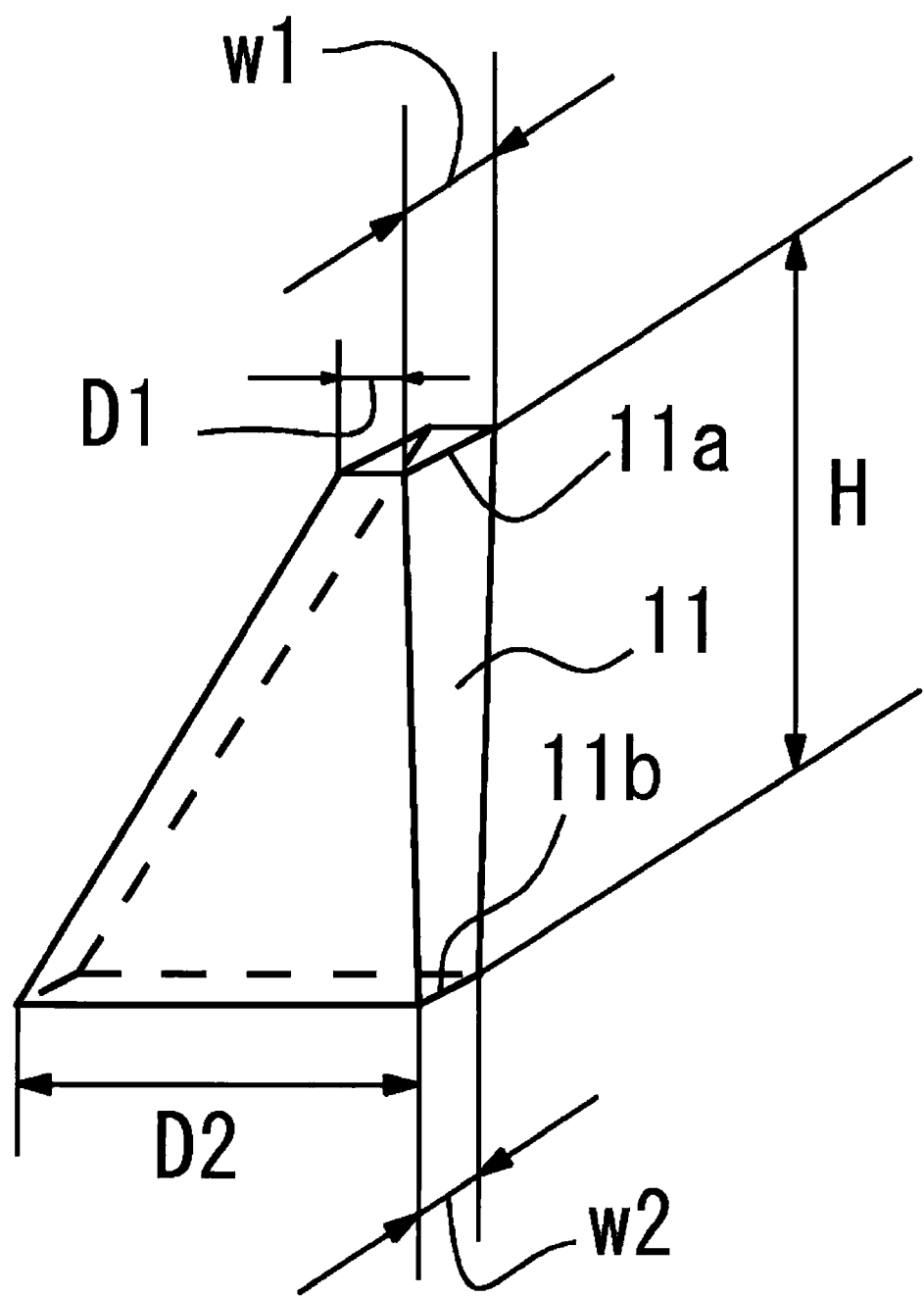
FIG. 2 is a view showing a first oblong hole.

Opening portions of the first oblong hole 11 and the second oblong hole 12 are trapezoidal, the parallel bases of the trapezoid are parallel to the tread surface. FIG. 2 is a view showing the first oblong hole 11. A width w1 on a long base 11a is on the tread surface side and a width w2 on a short base 11b is on the groove bottom side. Also, the depth of the first oblong hole 11 on the side of the long base 11a is defined as D1 and the depth of the first oblong hole 11 on the side of the short base 11b is defined as D2. D1 is shallower than D2 and the depth of the first oblong hole 11 gets deeper from the side of the long base 11a to the side of the short base 11b.

Figure 3:
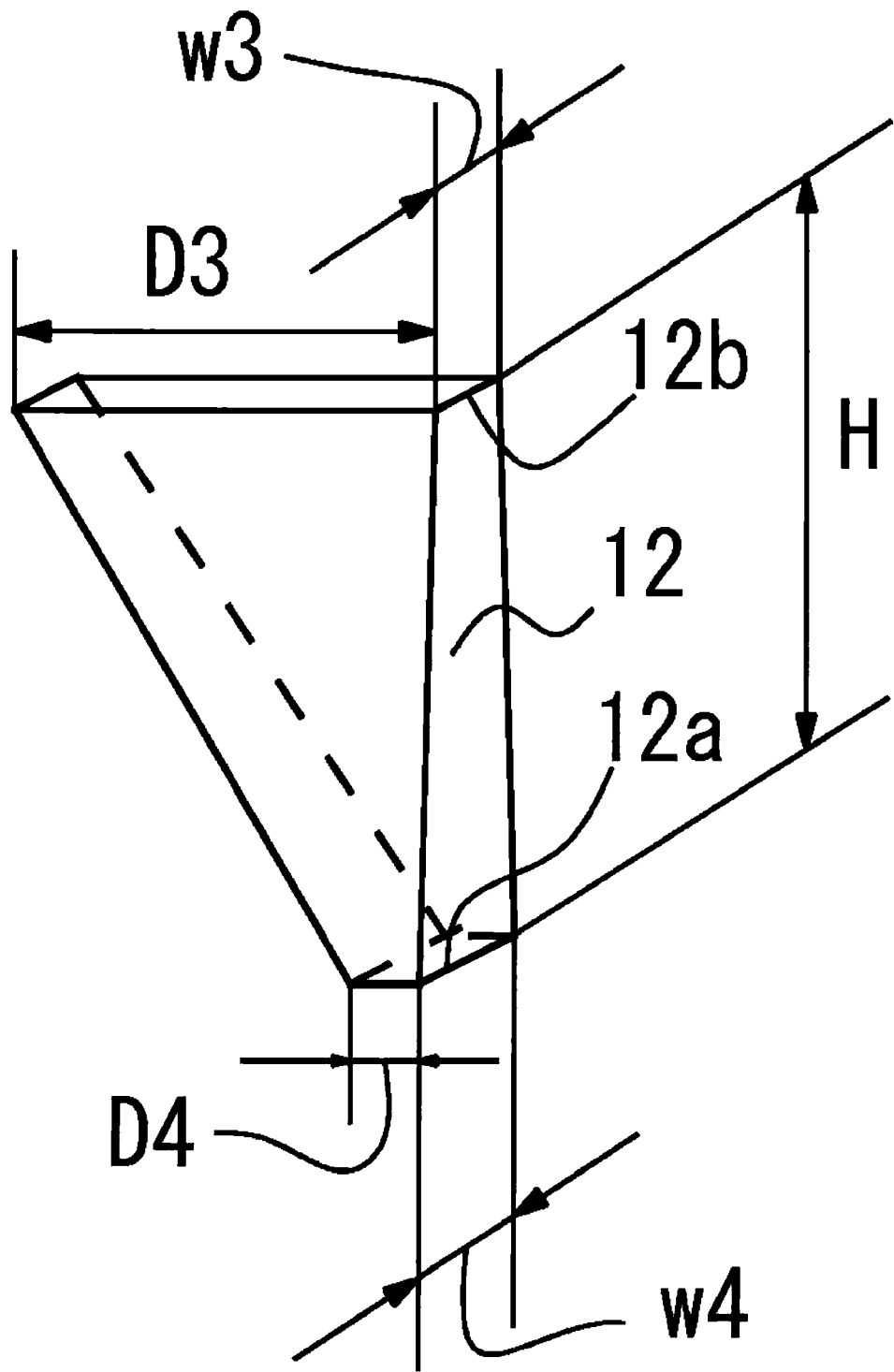
FIG. 3 is a view showing a second oblong hole.

On the other hand, in the second oblong hole 12 as shown in FIG. 3, a width w4 on a long base 12a is on the surface side of the groove bottom and a width w3 on a short base 12b is on the tread surface side. Also, the depth of the second oblong hole 12 on the side of the long base 12a is defined as D4 and the depth of the second oblong hole 12 on the side of the short base 12b is defined as D3. D4 is shallower than D3 and the depth of the second oblong hole 12 gets deeper from the side of the long base 12a to the side of the short base 12b.

The first oblong hole 11 and the second oblong hole 12 allow the friction resistance against the air flow in the main groove 1 to increase, and as a result, air columnar resonance noise is reduced. Furthermore, even if tire wear progresses to appearance of the first oblong holes 11 on the tread surface, since the depth D1 on the tread surface side is shallow, the rigidity of the block 2 is not rapidly decreased, nor is steering stability degraded. Therefore, as long as the oblong holes have the same cavity volume, air columnar resonance noise is reduced to the same degree, and steering stability is further improved, compared with the conventional tire with oblong holes having a constant depth arranged.

All of the oblong holes may be the first oblong holes 11, but from the viewpoint of achieving uniform rigidity of the block 2, the second oblong holes each having a deeper depth on the tread surface side may also be arranged. However, number of the first oblong holes 11 is preferably set at 50 to 100% of the sum of the first and second oblong holes 11 and 12. For example, the first oblong holes 11 and the second oblong holes 12 may be alternatively arranged so that the number of the first oblong holes 11 and the number of the second oblong holes 12 are equal. It is noted that when number of the first oblong holes 11 is less than 50%, steering stability is degraded by a rapid decrease in the rigidity of the block 2.

It is preferable that deeper depths D2 and D3 of the oblong holes 11 and 12 are at least not less than 0.5 mm and 0.05 to 0.3 times a width W of the main groove 1. When the depths D2 and D3 are shallow, the effect of reducing air columnar resonance noise becomes small. When the depths D2 and D3 are too deep, the rigidity of the block 2 is too lowered to ensure steering stability.

It is preferable that shallower depths D1 and D4 of the oblong holes 11 and 12 are not greater than 0.1 times a depth D of the main groove 1. More specifically, D1 and D4 may be 0 mm, but when they exceed 0.1 times the depth D of the main groove 1, the rigidity of the block 2 is too lowered to ensure steering stability.

It is preferable that the widths w1 to w4 of the oblong holes 11 and 12 are at least not less than 0.5 mm and 0.05 to 0.2 times the width W of the main groove 1. When the widths w1 to w4 are narrow, the effect of reducing air columnar resonance noise becomes small. When the widths w1 to w4 are too wide, the rigidity of the block 2 is too lowered to ensure steering stability.

It is preferable that a height H of the oblong hole 11 in the depth direction of the main groove 1 is 50 to 80% of the depth D of the main groove 1 and a height H of the oblong hole 12 in the depth direction of the main groove 1 is 50 to 80% of the depth D of the main groove 1. When the height H is less than 50% of the depth D of the main groove 1, the effect of reducing air columnar resonance noise becomes small. On the other hand, when it exceeds 80% of the depth D, the oblong holes 11 and 12 appear on the tread surface from the initial stage of wear and the rigidity of the block 2 is too lowered to ensure steering stability.

Furthermore, when the oblong holes 11 and 12 are in the closed state without being opened to the tread surface, the air flow is more disrupted, thereby increasing the effect of reducing air columnar resonance noise. Therefore, even if they are at the same height H, the oblong holes 11 and 12 are preferably formed on the groove bottom side.

It is preferable that the widths w1 and w4 of the oblong holes 11 and 12 on the sides having shallow depth are greater than 1.0 and equal to or less than 1.5 times wider than the widths w2 and w3 of the oblong holes 11 and 12 on the sides having deep depth. By setting as w1=w2 and w3=w4, opening portions of the oblong holes 11 and 12 may be formed into a rectangle shape. However, when the widths w1 and w4 exceed 1.5 times, the rigidity is lowered, thereby degrading both dry steering stability and wet steering stability.

A space P between the oblong holes 11 and 12 is preferably 0.7 to 2.5 mm. When the space is less than 0.7 mm, the portion sandwiched by the oblong holes 11 and 12 are easily damaged, such as tearing off and the like. On the other hand, when the space exceeds 2.5 mm, number of the oblong holes 11 and 12 gets declined, thereby resulting in less effect of reducing air columnar resonance noise.

The oblong holes 11 and 12 may be extended in the normal direction of the tread surface or by inclining in any directions at an angle within 45 degrees to the normal line of the tread surface. If the oblong holes 11 and 12 are inclined at over 45 degrees, the effect of reducing air columnar resonance noise gets decreased.

EXAMPLE

Tires of Examples according to the present invention and Comparative examples were manufactured and evaluated, respectively. Evaluation was made on the tire which has a size of 195/65R15 and a tread pattern comprising five rows of blocks in square shape whose one side is 30 mm formed by main grooves and transverse grooves each having 10 mm in width, and which is mounted to the rim having a rim size of 15×6J.

The tires comprising oblong holes as shown in FIGS. 1 to 3 were used in Examples and Comparative examples (except Comparative example 1). The tire of Comparative example 1 was provided with oblong holes having constant width and depth (w1=w2, D1=D2). The oblong holes of the tires in Examples and Comparative examples also extend in the normal direction of the tread surface, the dimensions of the oblong holes were as shown in Table 1. It is noted that evaluation of the tires is made under the condition where the upper end of each opening portion of the oblong holes is located on the groove bottom side by only 2 mm from the tread surface when they are brand-new and the tires are worn only 30% of the main groove depth (9 mm) (with the oblong holes opened on the tread surface).

Evaluation results are shown in FIG. 1. The dry steering stability and wet steering stability were the values obtained by sensory evaluation on steering stability when traveling on a dry road or a wet road with the tire mounted to a 1500 cc front-wheel drive vehicle. With indices indicated on the basis where the Comparative example 1 is set as 100, it shows that the larger the index number becomes, the better steering stability can be obtained.

The noise level is obtained by measurement on air columnar resonance noise level at ⅓ octave-band 1 kHz by a bench test according to JASO-C606 (at the velocity of 50 km/h). The measured values are given by decibel value based on Comparative example 1. It shows that the larger a number becomes, the more noise level can be reduced.

TABLE 1

| | | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Dimension of oblong holes (mm) | Width w1(=w4) | 1.0 | 1.5 | 1.0 | 1.0 | 1.0 | 1.0 | 2.0 | 1.0 |
| | Width w2(=w3) | 1.0 | 1.0 | 1.0 | 1.0 | 1.0 | 1.0 | 1.0 | 1.0 |
| | Depth D1(=D4) | 0 | 0 | 1.0 | 0 | 1.25 | 0 | 0 | 1.5 |
| | Depth D2(=D3) | 2.5 | 2.5 | 2.5 | 2.5 | 1.25 | 2.5 | 2.5 | 2.5 |
| | Height H | 6.3 | 6.3 | 6.3 | 6.3 | 6.3 | 6.3 | 6.3 | 6.3 |
| | Space P | 1.0 | 1.0 | 1.0 | 1.0 | 1.0 | 1.0 | 1.0 | 1.0 |
| Ratio of first oblong hole (%) | | 50 | 50 | 50 | 100 | — | 45 | 50 | 50 |
| Dry steering stability | | 105 | 104 | 104 | 100 | 100 | 99 | 99 | 99 |
| Wet steering stability | | 105 | 106 | 107 | 108 | 100 | 101 | 102 | 102 |
| Noise level (dB) | | 0 | 0.3 | 0.3 | 0.6 | — | 0 | 0 | 0.3 |

Depth of main groove D: 9 mm
Width of main groove W: 10 mm

According to Table 1, in each Example, the dry steering stability is equal to or improved more than Comparative example 1, and the wet steering stability is improved. On the other hand, each of Comparative examples 2 to 4 shows that the dry steering stability is lowered and the wet steering stability is not that improved. Furthermore, it was found out in each Example that there was also a tire whose noise level is not increased but reduced.

What is claimed is:

1. A pneumatic tire with main grooves extending in the tire circumferential direction formed on a tread,
    wherein a sidewall of the main groove comprises first oblong holes each having an opening portion of a trapezoidal shape which is elongated in the depth direction of the main groove and whose depth D1 on the tread surface side is shallower than a depth D2 on the groove bottom side, and second oblong holes each having an opening portion of a trapezoidal shape which is elongated in the depth direction of the main groove and whose depth D4 on the groove bottom side is shallower than a depth D3 on the tread surface side,
    number of said first oblong holes is 50 to 100% of the sum of said first and second oblong holes,
    the depths D2 and D3 are at least not less than 0.5 mm and 0.05 to 0.3 times a width W of said main groove,
    the depths D1 and D4 are not greater than 0.1 times a depth D of said main groove,
    widths w of said first and said second oblong holes are at least not less than 0.5 mm and 0.05 to 0.2 times the width W of said main groove,
    heights H of said first and said second oblong holes in the depth direction of the main groove are 50 to 80% of the depth D of said main groove, and
    the trapezoidal shape of the first oblong holes and the trapezoidal shape of the second oblong holes are oppositely oriented.

2. The pneumatic tire as set forth in claim 1, wherein a width w1 on the tread surface side of the opening portion of said first oblong is greater than 1.0 and equal to or less than 1.5 times a width w2 on the groove bottom side and a width w4 on the groove bottom side of the opening portion of said second oblong hole is greater than 1.0 and equal to or less than 1.5 times a width w3 on the tread surface side.

* * * * *